(12) United States Patent
Iwata et al.

(10) Patent No.: US 10,505,576 B2
(45) Date of Patent: Dec. 10, 2019

(54) SUPPORT DEVICE FOR PORTABLE TERMINAL

(71) Applicant: NEC Platforms, Ltd., Kawasaki-shi, Kanagawa (JP)

(72) Inventors: Akihisa Iwata, Kanagawa (JP); Satoru Sugiyama, Kanagawa (JP)

(73) Assignee: NEC Platforms, Ltd., Kawasaki-shi, Kanagawa (JP)

(*) Notice: Subject to any disclaimer, the term of this patent is extended or adjusted under 35 U.S.C. 154(b) by 0 days.

(21) Appl. No.: 15/801,857

(22) Filed: Nov. 2, 2017

(65) Prior Publication Data

US 2018/0212638 A1 Jul. 26, 2018

(30) Foreign Application Priority Data

Jan. 25, 2017 (JP) .................................. 2017-011202

(51) Int. Cl.
*H04M 1/00* (2006.01)
*H04B 1/3888* (2015.01)
(Continued)

(52) U.S. Cl.
CPC ............ *H04B 1/3888* (2013.01); *A45F 5/00* (2013.01); *A45F 5/10* (2013.01);
(Continued)

(58) Field of Classification Search
CPC .................................................. H04B 1/3888
(Continued)

(56) References Cited

U.S. PATENT DOCUMENTS 9,287,917 B1* 3/2016 Tages .................... H04B 1/3888
2011/0205696 A1* 8/2011 Kawada ................ G06F 1/1616
361/679.01

(Continued)

FOREIGN PATENT DOCUMENTS

JP 2011-107991 A 6/2011
JP 2012-226733 A 11/2012

OTHER PUBLICATIONS

Windows-based business-purpose tablet-type POS "Twinpos S" adaptable to a variety of shop scenes, Japan, NEC Platforms, Oct. 2016, 2 pages.

(Continued)

*Primary Examiner* — Edward F Urban
*Assistant Examiner* — Max Mathew
(74) *Attorney, Agent, or Firm* — Sughrue Mion, PLLC

(57) ABSTRACT

A support device for a portable terminal includes a placement portion configured to place a portable terminal having a hand belt mounted to a back surface of the portable terminal and configured to receive a user's hand. The placement portion includes: a terminal placement surface configured to support the back surface of the portable terminal; and a belt-receiving recessed portion, which has a shape recessed with respect to the terminal placement surface in a direction perpendicular to the terminal placement surface and is configured to receive the hand belt of the portable terminal placed on the placement portion. The support device for a portable terminal is configured to support the portable terminal placed on the placement portion under a state in which the portable terminal is inclined rearward.

11 Claims, 12 Drawing Sheets

(51) Int. Cl.
  *A45F 5/10* (2006.01)
  *A45F 5/00* (2006.01)
(52) U.S. Cl.
  CPC . *A45F 2005/008* (2013.01); *A45F 2005/1013* (2013.01); *A45F 2200/0516* (2013.01); *A45F 2200/0525* (2013.01)
(58) Field of Classification Search
  USPC .......................................... 455/575.1, 575.8
  See application file for complete search history.

(56) References Cited

U.S. PATENT DOCUMENTS

| | | | | |
|---|---|---|---|---|
| 2012/0243152 | A1* | 9/2012 | Kawada | G06F 1/1613 361/679.01 |
| 2012/0257342 | A1* | 10/2012 | Shindo | H05K 5/023 361/679.02 |
| 2014/0054910 | A1* | 2/2014 | Kim | H04B 1/385 294/158 |
| 2014/0226292 | A1* | 8/2014 | Mochizuki | G06F 1/1626 361/752 |
| 2015/0304466 | A1* | 10/2015 | Tamatsu | H04M 1/04 379/447 |

OTHER PUBLICATIONS

JPO Office Action for Application No. 2017-011202 dated Mar. 22, 2017.

* cited by examiner

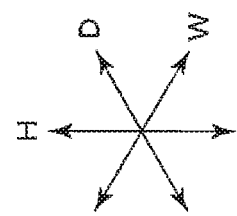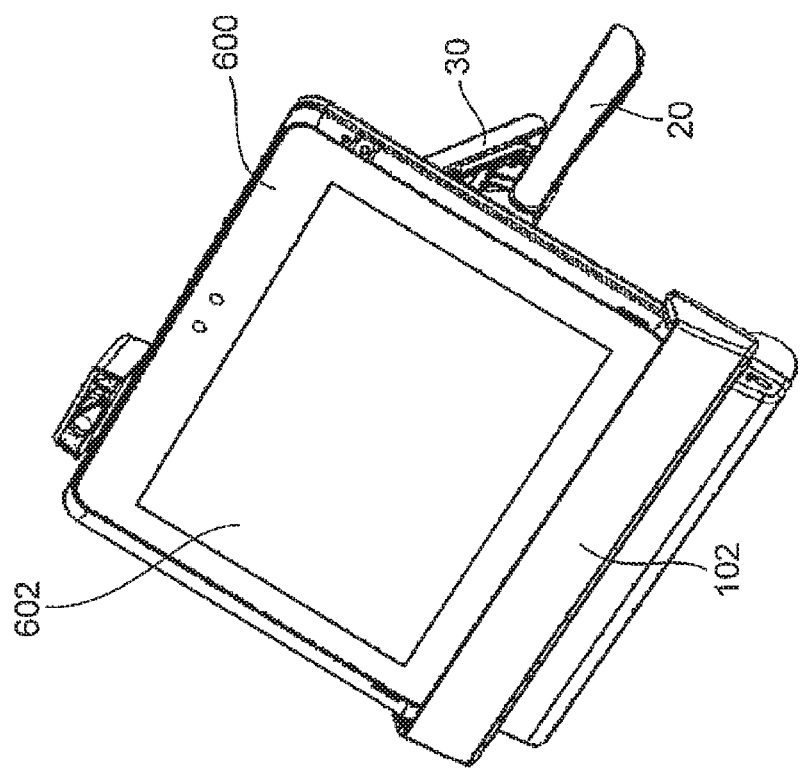
FIG. 1

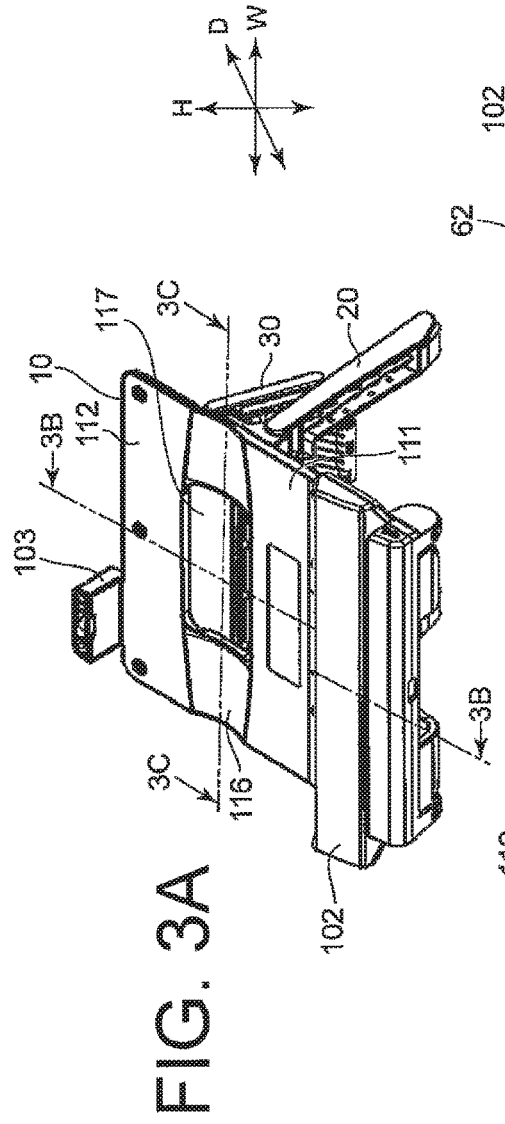
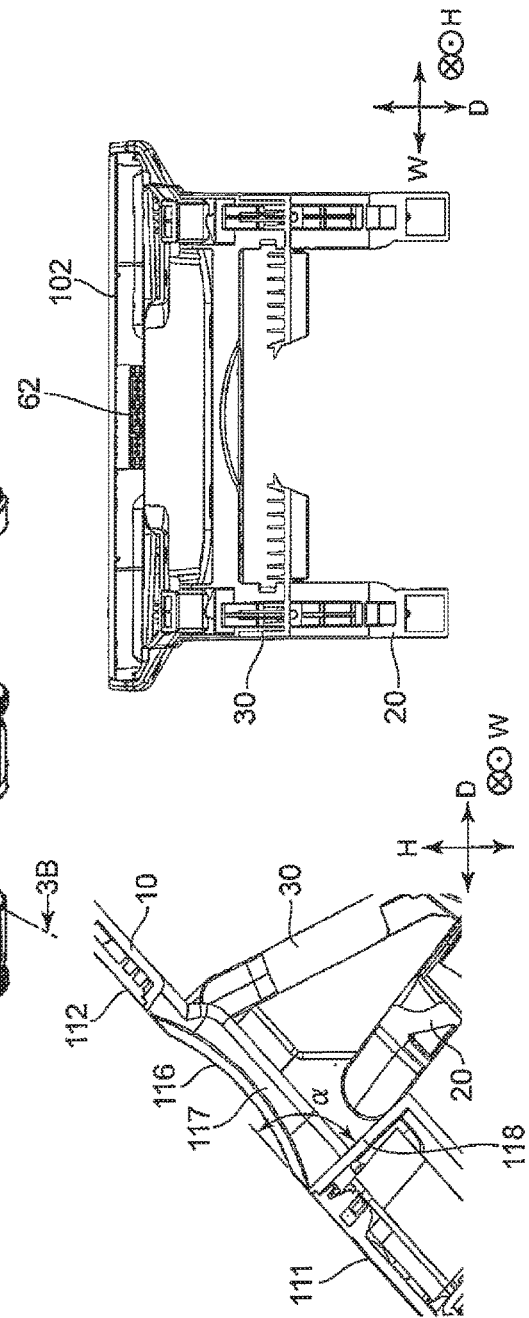
FIG. 3A
FIG. 3B
FIG. 3C

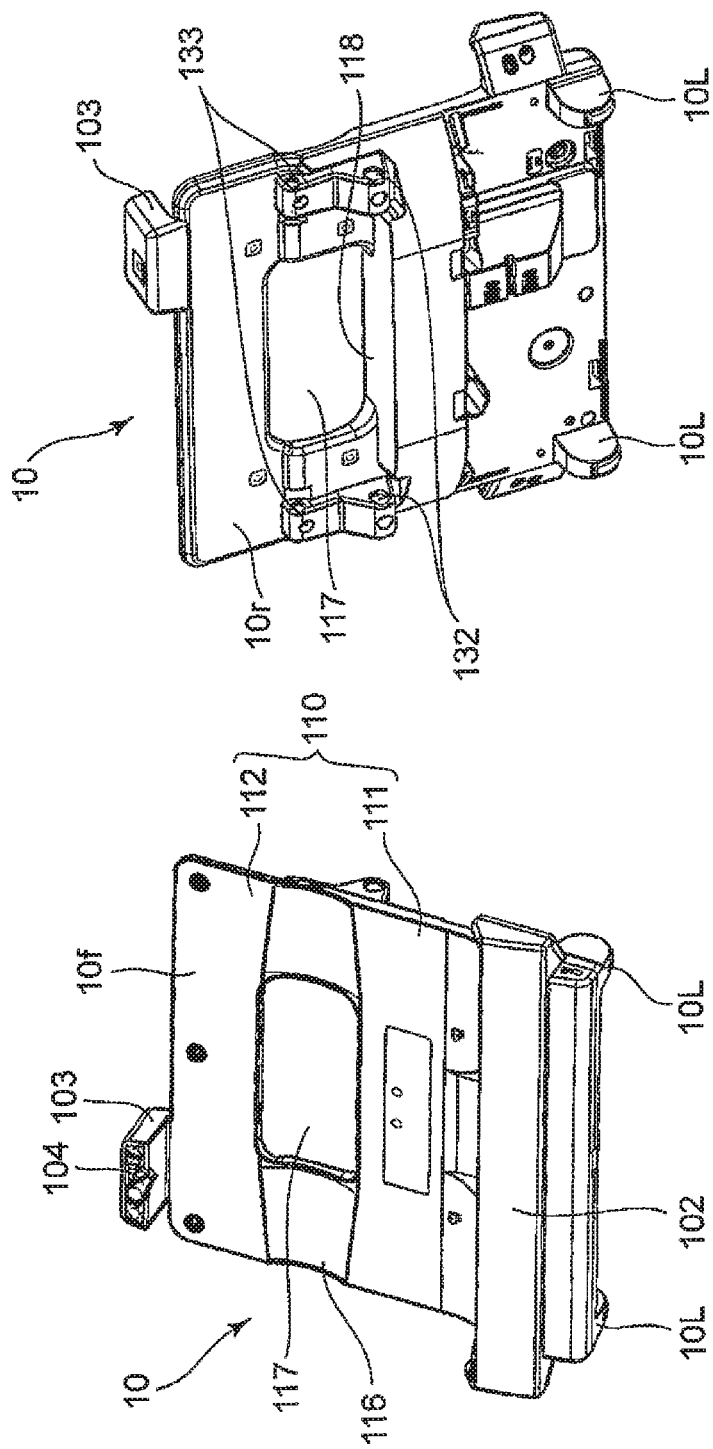

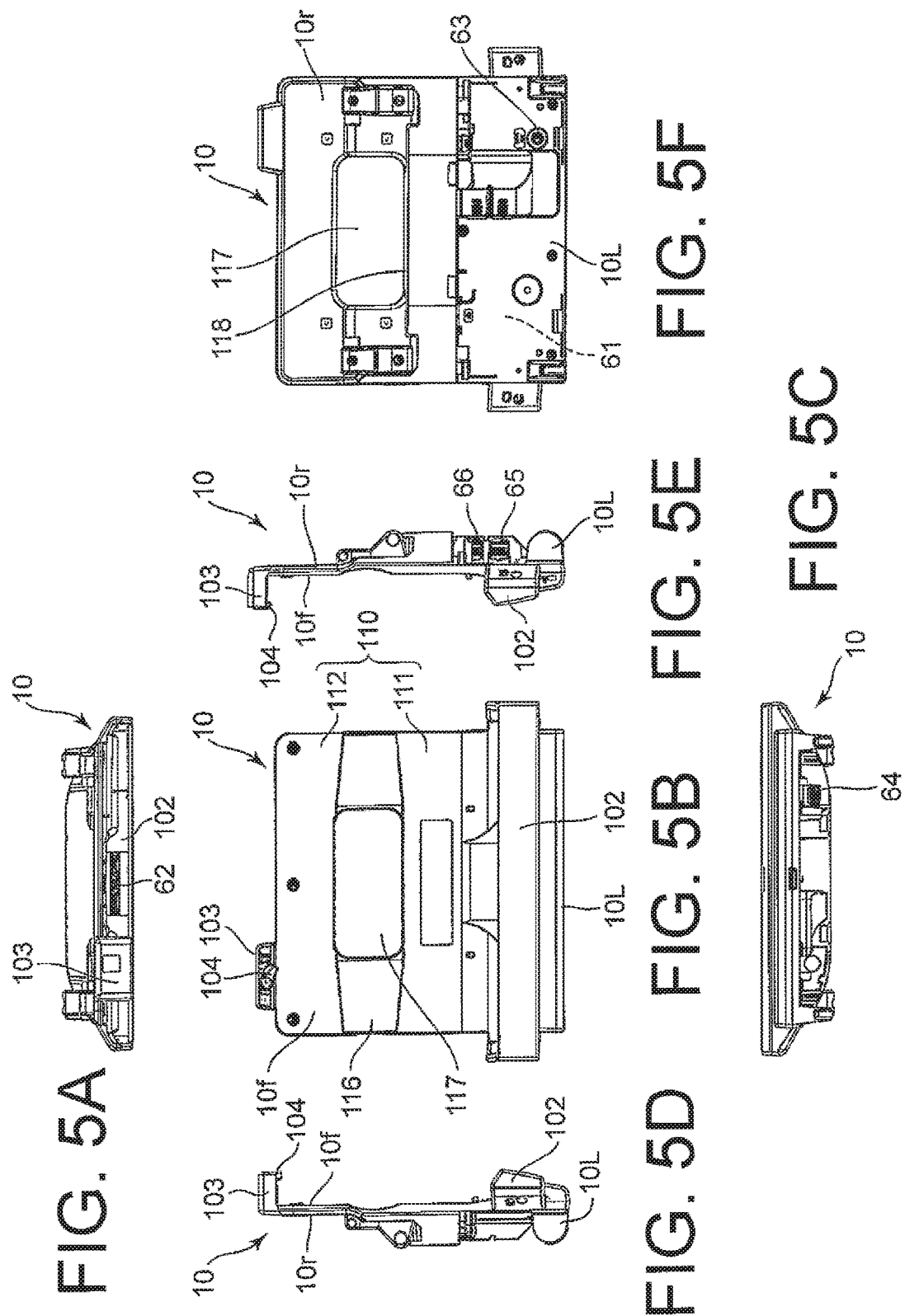

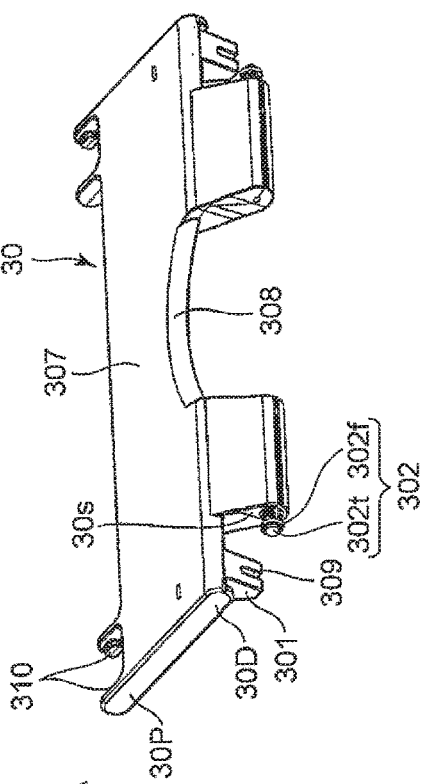
FIG. 6A
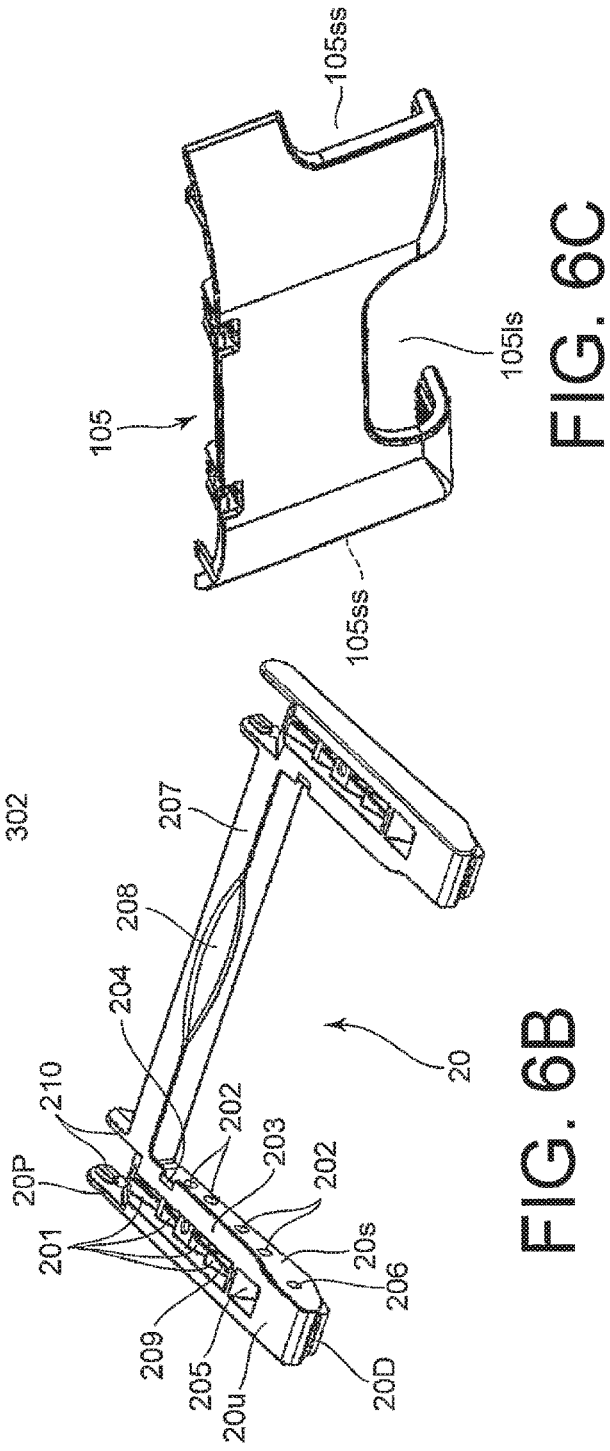
FIG. 6B
FIG. 6C

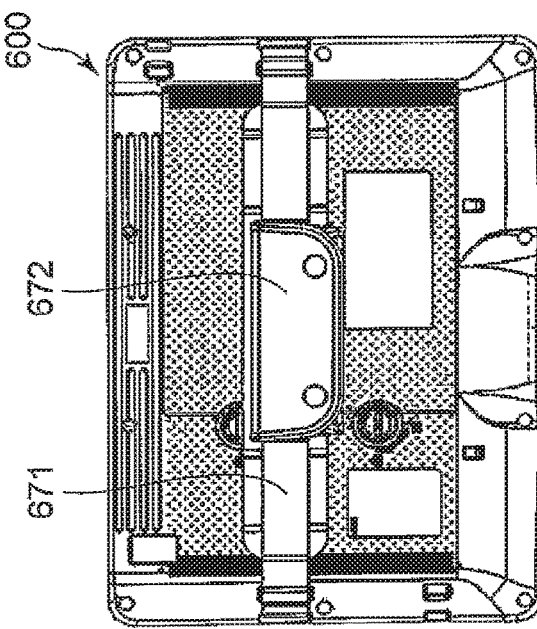
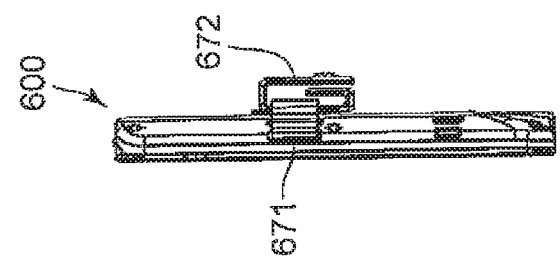
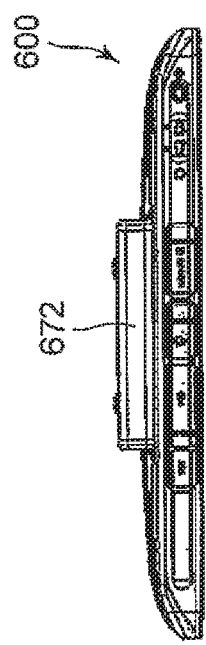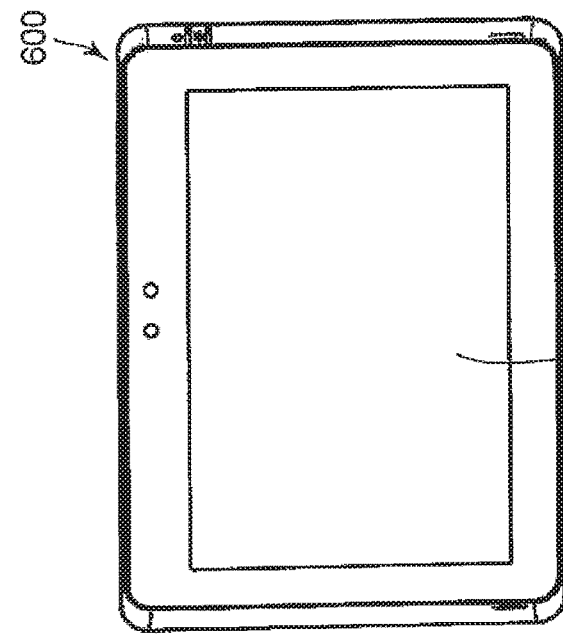

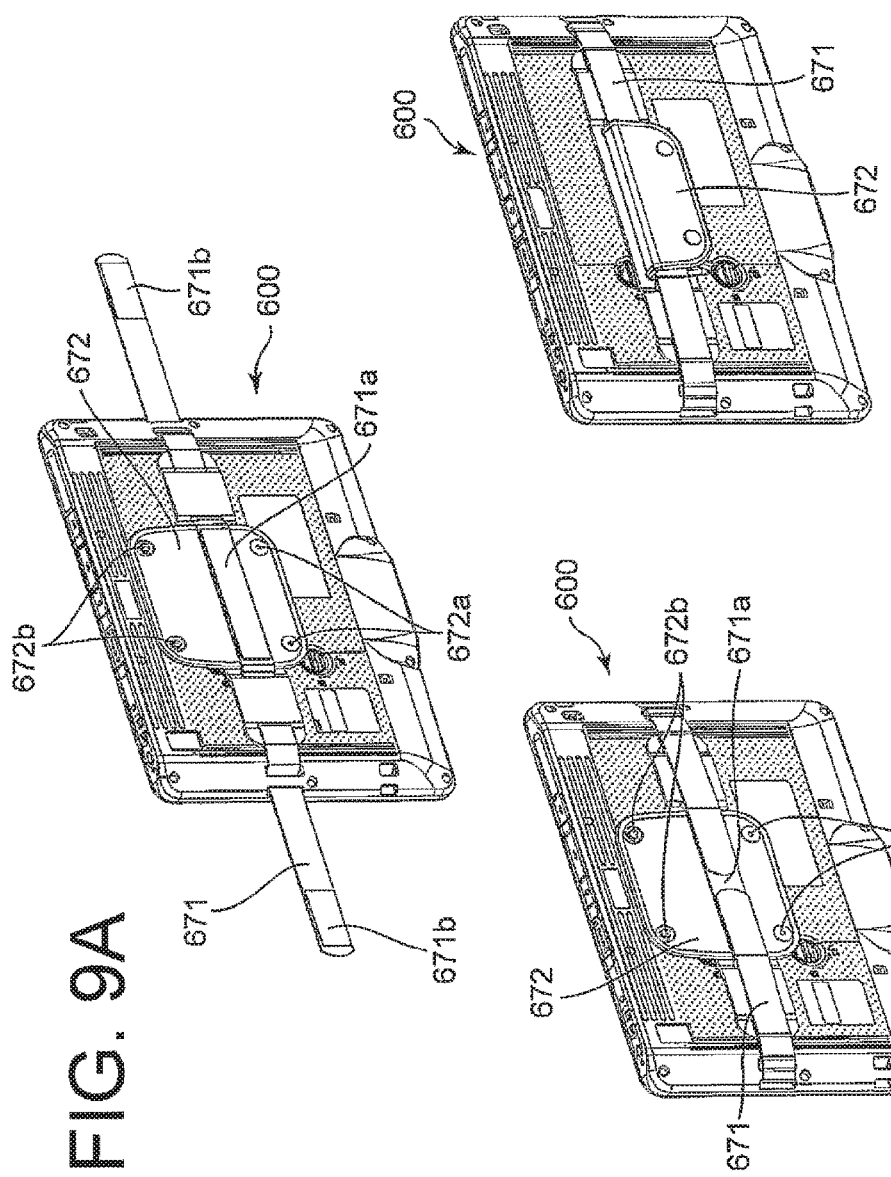

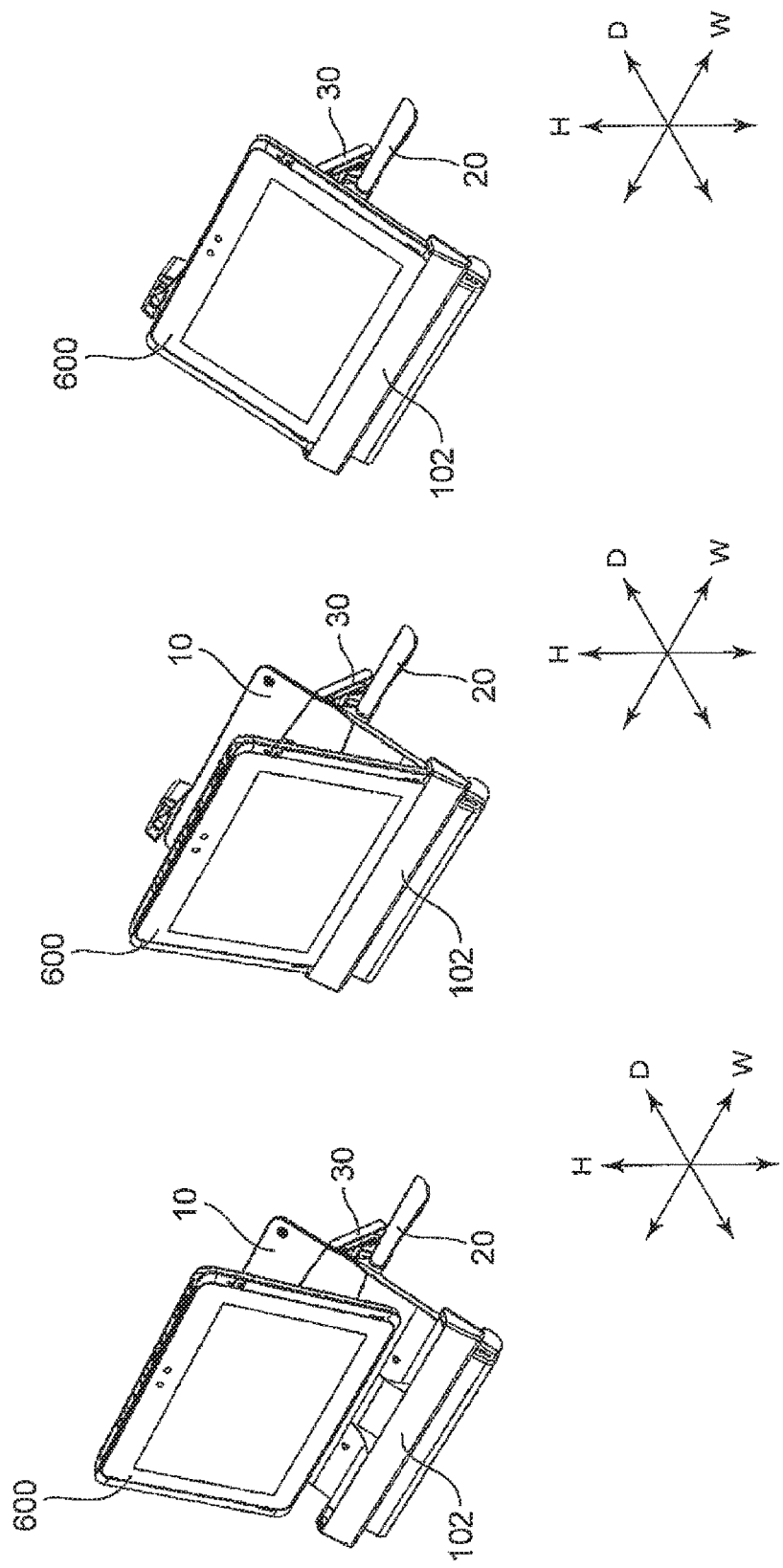

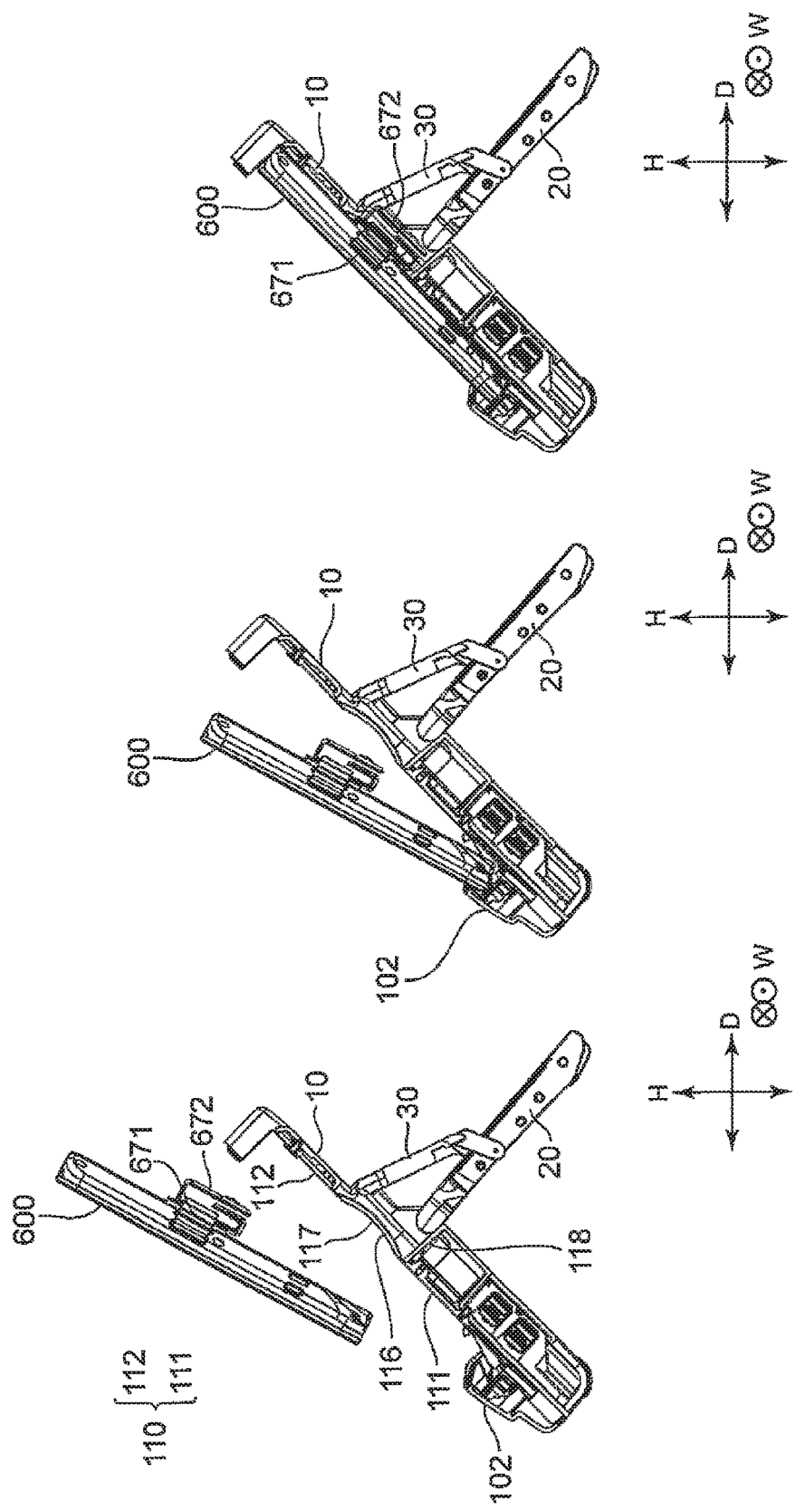

SUPPORT DEVICE FOR PORTABLE TERMINAL

This application is based upon and claims the benefit of priority from Japanese patent application No. 2017-011202, filed on Jan. 25, 2017, the disclosure of which is incorporated herein in its entirety by reference.

BACKGROUND OF THE INVENTION

1. Field of the Invention

This invention relates to a support device for a portable terminal, which is configured to support a portable terminal under a state in which the portable terminal is inclined rearward.

2. Description of the Related Art

As a portable terminal being one type of portable electronic devices, there is known, for example, a tablet-type point-of-sales (POS) terminal device to be used in a self-ordering system being one mode of POS systems. In many cases, the portable terminal of this type includes an input/output device (user interface) such as a touch panel type liquid crystal display.

Incidentally, when the portable terminal is used on a table, there may be used a support device configured to support the portable terminal under a state in which the portable terminal is inclined rearward. With this support device, the portable terminal can be supported while the touch panel type liquid crystal display or other input/output devices is oriented in a direction which enables a user to visually recognize a screen and perform a touch operation in an easy manner. The user uses the portable terminal placed on the support device by, for example, pressing the touch panel to perform input and visually recognizing processing results on the display screen.

Meanwhile, there has been given a portable terminal to which a hand belt configured to receive a user's hand is mounted. The hand belt is mounted to the portable terminal in order to prevent, for example, fall of the portable terminal when a user holds the portable terminal by hand to use the portable terminal.

In Japanese Unexamined Patent Application Publication (JP-A) No. 2011-107991 (hereinafter referred to as Patent Literature 1), there is disclosed a support base. A portable terminal to which a hand belt configured to receive a hand is mounted is placed on the support base, and the support base charges the portable terminal.

SUMMARY OF THE INVENTION

The support base disclosed in Patent Literature 1 supports a back surface of the portable terminal with use of a rear wall surface of the support base, which has a height lower than a position of the hand belt, in order to avoid interference with the hand belt. Thus, there may be a risk in that, when the portable terminal is used while being placed on the support base, and a touch panel is pressed, the portable terminal wobbles or comes off from the support base to fall rearward. That is, the support base disclosed in Patent Literature 1 has room for improvement with regard to a supporting action for the portable terminal.

Therefore, it is an object of this invention to provide a support device for a portable terminal capable of reliably supporting a portable terminal even when a hand belt configured to receive a user's hand is mounted to a back surface of the portable terminal.

According to one aspect of this invention, there is provided a support device for a portable terminal, comprising a placement portion configured to place a portable terminal having a hand belt mounted to a back surface of the portable terminal and configured to receive a user's hand, the placement portion comprising a terminal placement surface configured to support the back surface of the portable terminal placed on the placement portion; and a belt-receiving recessed portion, which has a shape recessed with respect to the terminal placement surface in a direction perpendicular to the terminal placement surface, and is configured to receive the hand belt of the portable terminal placed on the placement portion, wherein the support device for a portable terminal is configured to support the portable terminal placed on the placement portion under a state in which the portable terminal is inclined rearward.

BRIEF DESCRIPTION OF THE DRAWINGS

The above features and advantages of the present invention will be more apparent from the following description of certain preferred embodiments provided in conjunction with the accompanying drawings, among which:

FIG. 1 is a perspective view of a support device for a portable terminal according to an embodiment of this invention, as seen from a front side.

FIG. 3A is a perspective view of the support device for a portable terminal according to the embodiment of this invention, as seen from the front side.

FIG. 3B is a partial sectional view of the support device for a portable terminal according to the embodiment of this invention, which is taken along the cutting line 3B-3B in FIG. 3A.

FIG. 3C is a sectional view of the support device for a portable terminal according to the embodiment of this invention, which is taken along the cutting line 3C-3C in FIG. 3A.

FIG. 4A is a perspective view of a placement portion of the embodiment of this invention under a state in which a rear cover is removed, as seen from the front side.

FIG. 4B is a perspective view of the placement portion of the embodiment of this invention under the state in which the rear cover is removed, as seen from a rear side.

FIG. 5A is a top view of the placement portion of the embodiment of this invention.

FIG. 5B is a front view of the placement portion of the embodiment of this invention.

FIG. 5C is a bottom view of the placement portion of the embodiment of this invention.

FIG. 5D is a left side view of the placement portion of the embodiment of this invention.

FIG. 5E is a right side view of the placement portion of the embodiment of this invention.

FIG. 5F is a back view is a back view of the placement portion of the embodiment of this invention.

FIG. 6A is a perspective view of brace portions of the embodiment of this invention.

FIG. 6B is a perspective view of support leg portions of the embodiment of this invention.

FIG. 6C is a perspective view of the rear cover of the embodiment of this invention.

FIG. 8A is a top view of the portable terminal being the object to be placed on and supported by the support device for a portable terminal according to the embodiment of this invention.

FIG. 8B is a front view of the portable terminal being the object to be placed on and supported by the support device for a portable terminal according to the embodiment of this invention.

FIG. 8C is a right side view of the portable terminal being the object to be placed on and supported by the support device for a portable terminal according to the embodiment of this invention.

FIG. 8D is a back view of the portable terminal being the object to be placed on and supported by the support device for a portable terminal according to the embodiment of this invention.

FIG. 9A, FIG. 9B, and FIG. 9C are perspective views of the portable terminal being the object to be placed on and supported by the support device for a portable terminal according to the embodiment of this invention, as seen from the rear side.

FIG. 10A, FIG. 10B, and FIG. 10C are perspective views for illustrating a procedure of placing the portable terminal on the support device for a portable terminal according to the embodiment of this invention.

FIG. 11A, FIG. 11B, and FIG. 11C are sectional views for illustrating the procedure of placing the portable terminal on the support device for a portable terminal according to the embodiment of this invention.

DESCRIPTION OF THE EMBODIMENTS

Figure 2B:
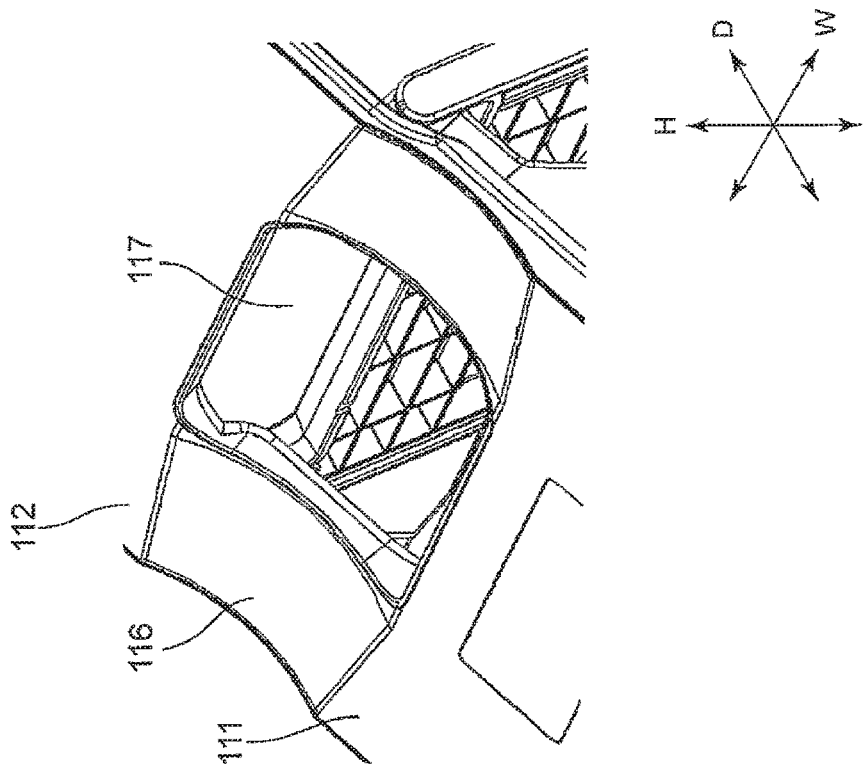
FIG. 2B is a partial perspective view for illustrating relevant parts of the support device for a portable terminal according to the embodiment of this invention, as seen from the front side.
Figure 2A:
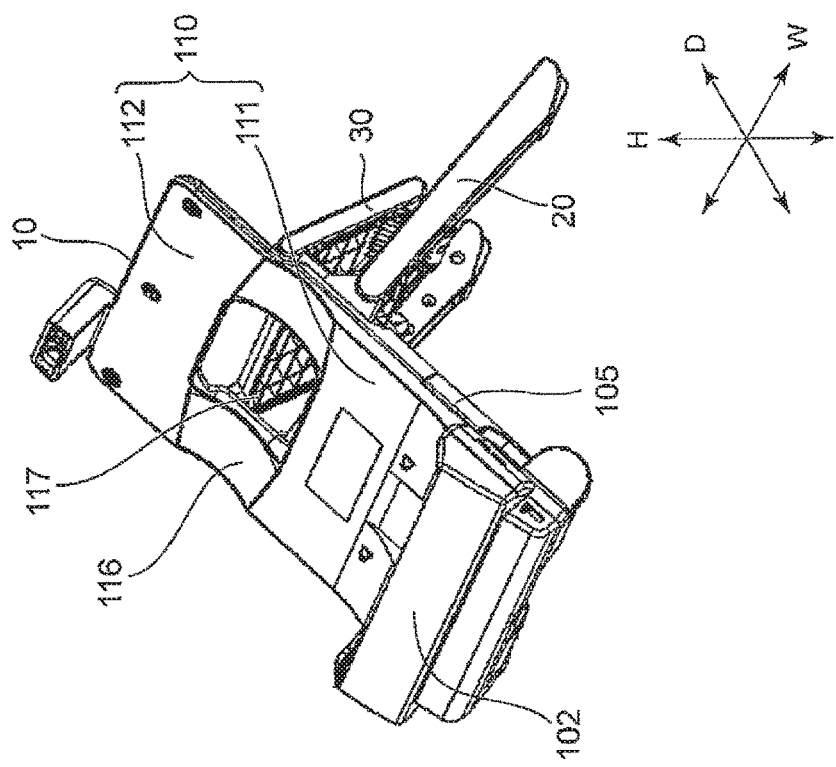
FIG. 2A is a perspective view of the support device for a portable terminal according to the embodiment of this invention, as seen from the front side.
Figure 7:
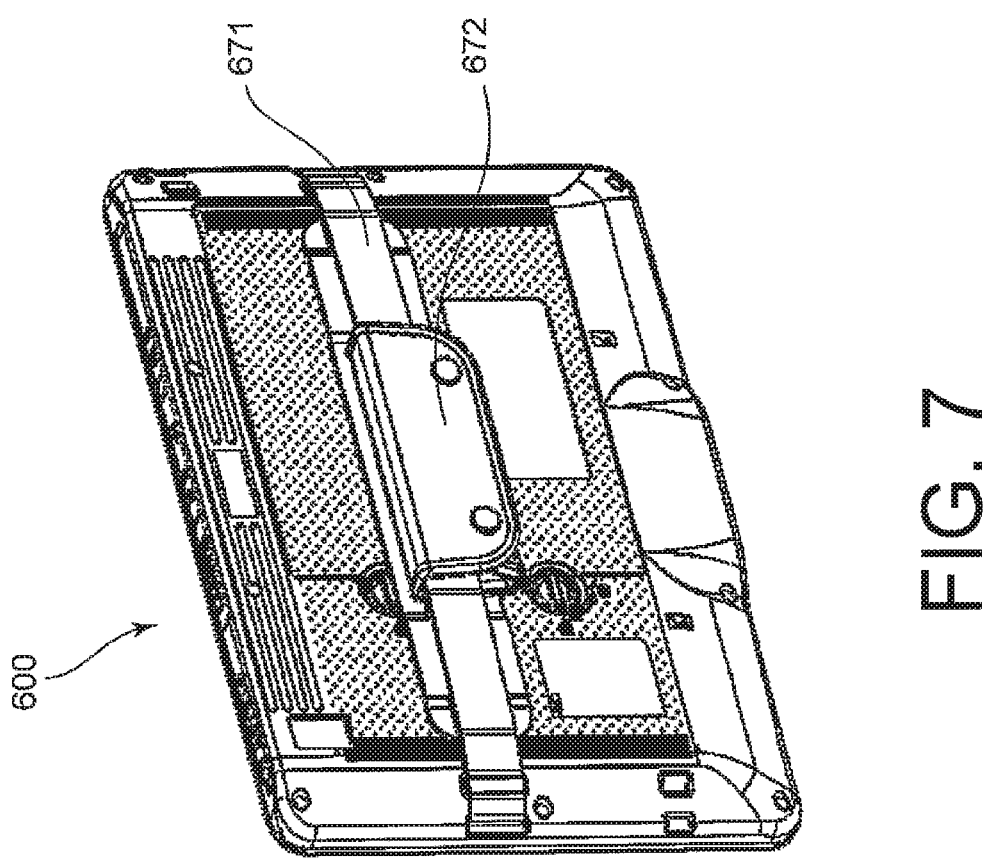
FIG. 7 is a perspective view of a portable terminal being an object to be placed on and supported by the support device for a portable terminal according to the embodiment of this invention, as seen from the rear side.

Now, description is made of an embodiment of this invention. In the embodiment described below, as a portable terminal, there is exemplified a tablet-type point-of-sales (POS) terminal device to be used in a self-ordering system being one mode of POS systems.

First, with reference to FIG. 7 to FIG. 9C, description is made of a portable terminal (POS terminal device) 600 being an object to be placed on and supported by a support device for a portable terminal.

The portable terminal 600 is of a tablet type, and includes a touch panel display 602 on a front surface of the portable terminal 600. A hand belt 671 configured to receive a user's hand is mounted to a back surface of the portable terminal 600. Further, at a lower end portion of the portable terminal 600, there are provided contacts 662 for charging and signal input/output, which are electrically connectable to contact pins 62 of the support device described later. The portable terminal 600 is placed on the support device for a portable terminal to which other devices (for example, a printer and a display portion for a customer) and an alternating current (AC) adapter are connected, to thereby function as a POS terminal device.

Next, with reference to FIG. 9A to FIG. 9C, description is made of a procedure of mounting the hand belt 671 to the portable terminal 600. As illustrated in FIG. 9A, end portions of the hand belt 671 are inserted through two hand-belt insertion holes formed in the portable terminal 600. Next, as illustrated in FIG. 9B, both side portions of the hand belt 671 are folded back, and hook-and-loop fasteners 671b provided at end portions of the hand belt 671 are fixed to a hook-and-loop fastener 671a provided at a center of the hand belt 671. On a back side of the hook-and-loop fastener 671a provided at the center of the hand belt 671, a pad 672 is fixed. In accordance with fixed positions of the hook-and-loop fasteners 671b at the end portions with respect to the hook-and-loop fastener 671a at the center, a length of the hand belt 671 can be adjusted. Finally, as illustrated in FIG. 9C, an upper side of the pad 672 is folded back, and a pair of male snap fasteners 672b provided to the upper side of the pad 672 is fitted to a pair of female snap fasteners 672a provided to a lower side of the pad 672. In this manner, fixed portions of the hook-and-loop fasteners are covered with the pad 672.

With reference to FIG. 1 to FIG. 5F, the support device for a portable terminal according to the embodiment of this invention includes a placement portion 10, a pair of support leg portions 20, and a pair of brace portions 30. The placement portion 10 is configured to place the portable terminal 600 having the hand belt 617 mounted to the back surface of the portable terminal 600 and configured to receive a user's hand. The support device for a portable terminal is configured to support the portable terminal 600 placed on the placement portion 10 under a state in which the portable terminal 600 is inclined rearward. In the drawings, the arrows denoted by reference symbols W, H, and D represent a width direction, a height direction, and a depth direction of the support device, respectively. A width direction of the placement portion 10 is parallel to the width direction of the support device.

The placement portion 10 has, on a front surface 10f thereof, a terminal placement surface 110 and a belt-receiving recessed portion 116. The terminal placement surface 110 is configured to support the back surface of the portable terminal 600 placed on the placement portion 10. The belt-receiving recessed portion 116 has a shape recessed with respect to the terminal placement surface 110, and is configured to receive the hand belt 671 of the portable terminal 600 placed on the placement portion 10.

The belt-receiving recessed portion 116 extends along the width direction of the placement portion 10 so as to correspond to the portable terminal 600 with the hand belt 671 extending in the width direction of the portable terminal.

The terminal placement surface 110 has a first placement surface 111 and a second placement surface 112, which are aligned in an up-and-down direction of the placement portion 10 across the belt-receiving recessed portion 116. The first placement surface 111 is positioned on a lower side of the belt-receiving recessed portion 116, and the second placement surface 112 is positioned on an upper side the belt-receiving recessed portion 116. The first placement surface 11 and the second placement surface 112 have a relationship of being flush with each other when the first placement surface 111 and the second placement surface 112 are not divided by the belt-receiving recessed portion 116.

A shape of the belt-receiving recessed portion 116 in plan view which is viewed from a direction perpendicular to the terminal placement surface 110 is formed so that the belt-receiving recessed portion 116 is gradually widened as being away from both ends of the belt-receiving recessed portion 116 in an extending direction of the belt-receiving recessed portion 116, that is, in the width direction of the placement portion 10.

Further, a cross-sectional shape of the belt-receiving recessed portion 116 along a direction perpendicular to the extending direction of the belt-receiving recessed portion 116, that is, along a direction perpendicular to the width direction of the placement portion 10 is formed into a curved shape protruding rearward in a depth direction D of the placement portion 10. In this example, the belt-receiving recessed portion 116 has a depth gradually increased as being away from both ends of the belt-receiving recessed portion 116 in the extending direction of the belt-receiving recessed portion 116, that is, in the width direction of the placement portion 10. A depth of recessed surfaces at end portions of side surfaces of the placement portion 10 is ensured to be larger than a thickness of the hand belt 671.

Further, the belt-receiving recessed portion 116 extends over an entire width of the placement portion 10, and has a width slightly larger than a width of the hand belt 671 at both ends in the extending direction of the belt-receiving recessed portion 116, that is, in the width direction of the placement portion 10.

The placement portion 10 has a structure so as to correspond to the portable terminal 600 with the hand belt 671 to which the pad 672 is mounted so as to surround the hand belt 671. That is, the placement portion 10 further includes a pad-receiving opening portion 117 serving as a pad-receiving recessed portion. The pad-receiving opening portion 117 has a shape of being further recessed in the belt-receiving recessed portion 116, and is configured to receive the pad of the hand belt of the portable terminal 600 placed on the placement portion 10. In this example, the pad-receiving opening portion 117 has a through-hole shape penetrating through the placement portion 10. The pad-receiving opening portion 117 has an opening area large enough for the pad 672 of the hand belt 671 to pass through the pad-receiving opening portion 117. In this invention, the pad-receiving recessed portion may be a bottomed recessed portion instead of a recessed portion having a through-hole shape as in this example.

The placement portion 10 further includes a pad-supporting wall portion 118. The pad-supporting wall portion 118 extends rearward of the placement portion 10 from a lower side portion of the pad-receiving opening portion 117, and is configured to support the pad 672 of the portable terminal 600 placed on the placement portion 10. As illustrated in FIG. 3B, in this example, the pad-supporting wall portion 118 forms an angle α of about 90 degrees with respect to the first placement surface 111 (terminal placement surface). Similarly to the lower side portion of the pad-receiving opening portion 117, a wall portion extending rearward from the pad-receiving opening portion 117 may be provided to any one of an upper side portion, a right side portion, and a left side portion or to all of the side portions of the pad-receiving opening portion 117.

The placement portion 10 further includes a terminal receiving portion 102. The terminal receiving portion 102 is provided on a lower side of the front surface 10f of the placement portion 10. The terminal receiving portion 102 has a pocket shape, and is configured to receive and support the lower end portion of the portable terminal 600 placed on the placement portion 10. As illustrated in FIG. 3C, in the terminal receiving portion 102, there are provided the above-mentioned contact pins 62 of a probe type, which are brought into contact with the contacts 662 provided to the lower end portion of the portable terminal 600.

With reference to FIG. 5A to FIG. 5F, the placement portion 10 includes the above-mentioned contact pins 62 of a prove type, a charging circuit 61, a connector 63 to be connected to a cable connector of an AC adapter (not shown), and connectors 64, 65, and 66 for signal input/output. The charging circuit 61 is built in the placement portion 10.

Further, the placement portion 10 includes a placed-object holding portion 103, an openable and closable holding claw 104, and a rear cover 105 (FIG. 6C). The placed-object holding portion 103 and the holding claw 104 are provided to the upper side of the front surface 10f of the placement portion 10, and are configured to releasably hold an upper end portion of the portable terminal 600 received in the terminal receiving portion 102. The rear cover 105 is removably mounted to a rear surface 10r. As illustrated in FIG. 6C, in order to lead out the cable connectors (not shown) to be connected to the connectors 63 to 66, lead-out cutout portions 105ss are formed on both right and left sides of the rear cover 105, and a lead-out cutout portion 105ls is formed on the lower side of the rear cover 105.

With reference to FIG. 6B, each of two support leg portions of the pair of support leg portions 20 includes a plurality of receiving seats 201, a plurality of cone-shaped hole portions 202, and support-leg-portion turn shafts 210 being turn shafts for the support leg portions. The pair of support leg portions 20 includes a support-leg coupling recessed portion 208 being a recessed portion formed in a support-leg coupling portion 207. The two support leg portions are coupled to each other through the support-leg coupling portion 207. An intermediate plate 209 is provided to the plurality of receiving seats 201.

With reference to FIG. 6A, each of two brace portions of the pair of brace portions 30 includes an anchor portion 301 protruding from a distal end 30D, and an urging stud 302. The anchor portion 301 includes a recessed portion 309. Further, each of the two brace portions of the pair of brace portions 30 includes brace-portion turn shafts 310 being turn shafts for the brace portions. The pair of brace portions 30 includes a brace coupling recessed portion 308 being a recessed portion formed in a brace coupling portion 307. The two brace portions of the pair of brace portions 30 are coupled to each other through the brace coupling portion 307. The urging stud 302 is provided near the distal end 30D on an outer surface 30s facing an inner surface 20s of each of the support leg portions of the pair of support leg portions 20. The urging stud 302 protrudes under a state of being urged outward by a coil spring (not shown) in the width direction of the placement portion 10, and has a semi-spherical tip end 302t, and a flange portion 302f at a base end part of the semi-spherical tip end 302t. When the anchor portion 301 is received in any one of the plurality of receiving seats 201 of each of the support leg portions of the pair of support leg portions 20, the urging stud 302 enters the cone-shaped hole portion 202 corresponding to the receiving seat 201 receiving the anchor portion 301.

Referring back to FIG. 6B, each of the two support leg portions of the pair of support leg portions 20 further includes a rib 203. The rib 203 protrudes inward from an end side of the inner surface 20s, which is adjacent to an upper surface 20u, in the width direction of the placement portion 10, and extends in a longitudinal direction of the leg portion. Further, the rib 203 includes a cutout portion (cutout rib) 204 near a proximal end 20P of each of the support leg portions of the pair of support leg portions 20. The rib 203 prevents the urging stud 302 of each of the brace portions of the pair of brace portions 30 from dropping off from the inner surface 20s while the urging stud 302 slides on the inner surface 20s of each of the support leg portions of the pair of support leg portions 20. Further, as illustrated in FIG. 6B, each of the two support leg portions of the pair of support leg portions 20 further includes an anchor receiving portion 205 and a cone-shaped hole portion 206 for folding. The semi-spherical tip ends 302t of the urging studs 302 of the pair of brace portions 30 are allowed to pass through the cutout portions 204 of the pair of support leg portions 20 so that the pair of brace portions 30 and the pair of support leg portions 20 can be separated from each other. Then, the pair of brace portions 30 and the pair of support leg portions 20 are independently turned so as to be folded in parallel to the rear surface 10r of the placement portion 10. The anchor receiving portion 205 is formed in each of the upper surfaces 20u of each of the two support leg portions of the pair of support leg portions 20. The anchor receiving portion 205 has such a recessed shape as to receive the anchor portion 301 of each of the brace portions of the pair of brace portions 30, which is also folded in parallel to the rear surface 10r of the placement portion 10 when the pair of support leg portions 20 is folded in parallel to the rear surface 10r of the placement portion 10. The cone-shaped hole portion 206 for folding is formed in each of the inner surfaces 20s of the two support leg portions of the pair of support leg portions 20 so as to correspond to the anchor receiving portion 205.

As illustrated in FIG. 4B, in the rear surface 10r of the placement portion 10, there are formed holes 132 for the support-leg-portion turn shafts, which are configured to receive the support-leg-portion turn shafts 210, and holes 133 for the brace-portion turn shafts, which are configured to receive the brace-portion turn shafts 310.

The support device is configured to support the portable terminal 600 placed on the placement portion 10 with lower ends 10L of the placement portion 10 and distal ends 20D of the pair of support leg portions 20 under a state in which the portable terminal 600 is inclined rearward in the depth direction D. Particularly, in accordance with which ones of the plurality of receiving seats 201 of the pair of support leg portions 20 receive the anchor portions 301 of the pair of brace portions 30, an angle of the pair of support leg portions 20 with respect to the placement portion 10 is changeable so that an inclination angle of the portable terminal 600 placed on the placement portion 10 is changeable.

In the support device, after the pair of brace portions 30 is removed from the pair of support leg portions 20, the pair of support leg portions 20 and the pair of brace portions 30 are folded in parallel to the rear surface 10r of the placement portion 10. Accordingly, the portable terminal 600 placed on the placement portion 10 can be set on a table (not shown) in a lying posture. The portable terminal 600 can also be placed on the placement portion 10, which is set hanging on a wall (not shown).

Next, with reference to FIG. 10A to FIG. 10C and FIG. 11A to FIG. 11C, description is made of a procedure of placing the portable terminal 600 with respect to the support device. In each of FIG. 11A to FIG. 11C, the support device is illustrated in a sectional view taken along the cutting line 3B-3B in FIG. 3A.

As illustrated in FIG. 10A and FIG. 11A, the lower end portion of the portable terminal 600 is lowered from above to the terminal receiving portion 102 of the support device placed on the table (not shown).

Then, as illustrated in FIG. 10B and FIG. 11B, the lower end portion of the portable terminal 600 is inserted to the terminal receiving portion 102, and the portable terminal 600 is inclined rearward. Accordingly, as illustrated in FIG. 10C and FIG. 11C, the portable terminal 600 is supported by the terminal placement surface 110 of the placement portion 10.

Under a state illustrated in FIG. 10C and FIG. 11C, the hand belt 671 including the pad 672 are received by the belt-receiving recessed portion 116 and the pad-receiving opening portion 117, and the back surface of the portable terminal 600 is held in abutment against the first placement surface 111 and the second placement surface 112. Therefore, the portable terminal 600 to which the hand belt 671 is mounted can be used in a stable manner. The support device has the belt-receiving recessed portion 116 in the placement portion 10, and the belt-receiving recessed portion 116 has the recessed surface having the above-mentioned shape. Therefore, when the portable terminal 600 is placed, the pad 672 of the hand belt 671 is led to the pad-receiving opening portion 117 along the recessed surface. Further, even when the length of the hand belt 671 is adjusted to be large, an excessive part of the hand belt 671 is received by the pad-receiving opening portion 117 together with the pad 672. Meanwhile, the hand belt 671 including the pad 672, which is received by the pad-receiving opening portion 117, is supported by the pad-supporting wall portion 118. Accordingly, when the portable terminal 600 is removed from the support device, the hand belt 671 is lifted along the pad-supporting wall portion 118. Thus, there is no risk of causing a problem that, for example, the hand belt 671 is caught. That is, the support device enables smooth placement and removal of the portable terminal 600.

Figure 12B:
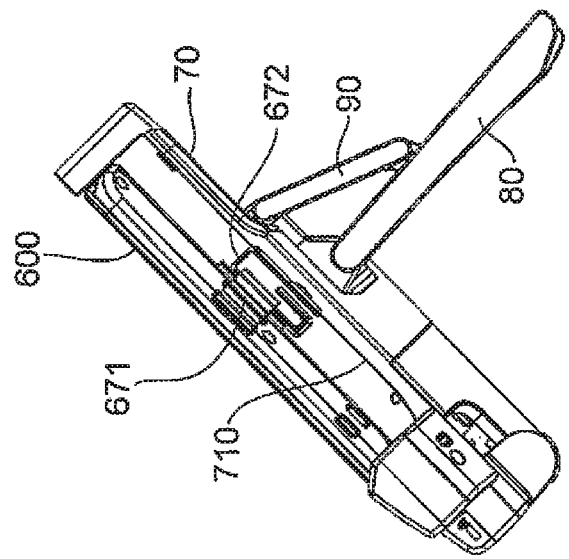
FIG. 12B is a side view for illustrating a state in which a portable terminal is placed on the related-art support device for a portable terminal.
Figure 12A:
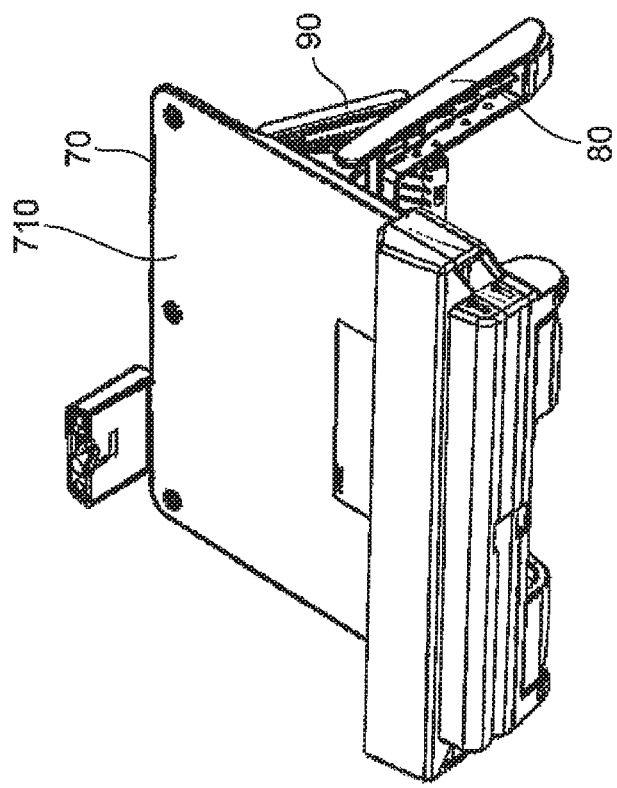
FIG. 12A is a perspective view of a related-art support device for a portable terminal.

With reference to FIG. 12A and FIG. 12B, in order to describe effects of this invention, description is made of a related-art support device for a portable terminal. FIG. 12A and FIG. 12B are referred only for the purpose of describing the effects of the support device for a portable terminal according to this invention.

As illustrated in FIG. 12A, the related-art support device includes a placement portion 70, a pair of support leg portions 80, and a pair of brace portions 90. The placement portion 70 has a placement surface 710 on a front surface of the placement portion 70. However, unlike this invention, the placement portion 70 does not have a belt-receiving recessed portion.

As illustrated in FIG. 12B, when the portable terminal 600 to which the hand belt 671 is mounted is placed on the placement portion 70 without a belt-receiving recessed portion, a thickness at the placement portion 70 is disadvantageously increased by a thickness amount of the hand belt 671 including the pad 672. In contrast, the support device for a portable terminal according to this invention has the belt-receiving recessed portion having the pad-receiving recessed portion (pad-receiving opening portion), and the pad and the hand belt are received. Therefore, the thickness at the placement portion can be reduced by the thickness of the pad and the hand belt received in the pad-receiving recessed portion (pad-receiving opening portion).

Further, the portable terminal 600 is placed on the related-art support device through intermediation of the hand belt 671, which includes the pad 672 and can be adjusted in length. Thus, a gap between the back surface of the portable terminal 600 and the placement surface 710 is not constant. When the support device includes the contact pins for communication with other devices through cables or for charging, there is required a structure configured to set a constant gap between the back surface of the portable terminal 600 and the placement surface 710. In contrast, the support device for a portable terminal according to this invention does not require the structure configured to set a constant gap between the back surface of the portable terminal 600 and the placement surface 710.

Further, the portable terminal 600 is placed on the related-art support device through intermediation of the hand belt 671, which includes the pad 672 and can be adjusted in length, and hence there is a risk in that an operation screen is inclined at the time of operation of the portable terminal 600 thus placed. Accordingly, a structure configured to prevent the operation screen from being inclined is required. In contrast, the support device for a portable terminal according to this invention does not require the structure configured to prevent the operation screen of the portable terminal 600 thus placed from being inclined.

This invention is not limited to the embodiment described above.

For example, in the above-mentioned embodiment, the support device for a portable terminal includes the support portion, which includes a combination of the brace portions and the support leg portions and can be changed in support angle for the placement portion. However, the support device may include a support portion fixed in a predetermined angle.

Further, in the above-mentioned embodiment, the support device for a portable terminal includes the contact pins for connection to the contacts of the portable terminal so that the portable terminal thus placed is allowed to perform communication with other devices through cables and is charged. However, the support device for a portable terminal may allow only the communication with other devices, or may only be charged. Alternatively, the support device for a portable terminal may not include the contact pins for connection with the contacts of the portable terminal, and may not allow communication with other devices through cables and may not allow charging. For example, the portable terminal may solely be used, or may include a wireless unit to perform wireless communication with other devices.

Further, in the above-mentioned embodiment, the support device for a portable terminal has the belt-receiving recessed portion having the pad-receiving opening portion. Instead of such structure, there may be provided, over the entire width of the placement portion, a groove portion which has a U-shaped cross section and can receive the hand belt including the pad without interfering with abutment of the back surface of the portable terminal against the first placement surface and the second placement surface.

What is claimed is:

1. A support device for a portable terminal, comprising a placement portion configured to place the portable terminal having a hand belt mounted to a back surface of the portable terminal and configured to receive a user's hand,
   the placement portion comprising:
   a terminal placement surface configured to support the back surface of the portable terminal placed on the placement portion; and
   a belt-receiving recessed portion, which has a shape recessed with respect to the terminal placement surface in a direction perpendicular to the terminal placement surface, and is configured to receive the hand belt of the portable terminal placed on the placement portion,
   wherein the support device for the portable terminal is configured to support the portable terminal placed on the placement portion under a state in which the portable terminal is inclined rearward,
   wherein the belt-receiving recessed portion extends along a width direction of the placement portion so as to correspond to the hand belt extending in a width direction of the portable terminal,
   wherein the terminal placement surface has a first placement surface and a second placement surface, which are aligned in an up-and-down direction of the placement portion across the belt-receiving recessed portion, and
   wherein the first placement surface is positioned on a lower side of the belt-receiving recessed portion, and the second placement surface is positioned on an upper side of the belt-receiving recessed portion.

2. The support device for the portable terminal according to claim 1, wherein a shape of the belt-receiving recessed portion in plan view which is viewed from the direction perpendicular to the terminal placement surface is formed so that the belt-receiving recessed portion is gradually widened as being away from both ends of the belt-receiving recessed portion in an extending direction of the belt-receiving recessed portion.

3. The support device for the portable terminal according to claim 1, wherein a cross-sectional shape of the belt-receiving recessed portion along a direction perpendicular to an extending direction of the belt-receiving recessed portion is formed into a curved shape protruding rearward in a depth direction of the placement portion.

4. The support device for the portable terminal according to claim 1, wherein the belt-receiving recessed portion extends over an entire width of the placement portion, and has a width slightly larger than a width of the hand belt at both ends in an extending direction of the belt-receiving recessed portion.

5. The support device for the portable terminal according to claim 1, wherein the placement portion further includes a terminal receiving portion, which has a pocket shape, and is configured to receive and support a lower end portion of the portable terminal placed on the placement portion.

6. The support device for the portable terminal according to claim 1, further comprising:
   a pair of support leg portions including support leg portions coupled to each other in pairs in a width direction of the placement portion, the support leg portions each having a bar-like shape extending from a proximal end to a distal end of each of the support leg portions and having the proximal end mounted to a rear surface of the placement portion so that the each of the support leg portions is turnable about a turn shaft extending along the width direction of the placement portion; and
   a pair of brace portions including brace portions coupled to each other in pairs in the width direction of the placement portion, the brace portions each having a bar-like shape extending from a proximal end to a distal end of each of the brace portions and having the proximal end mounted to the rear surface of the placement portion so that the each of the brace portions is turnable about a turn shaft extending along the width direction of the placement portion,
   wherein the support device for the portable terminal is configured to support the portable terminal placed on the placement portion with lower ends of the placement portion and the distal ends of the support leg portions under a state in which the portable terminal is inclined rearward,
   wherein the each of the brace portions of the pair of brace portions has an anchor portion protruding from the distal end, wherein the each of the support leg portions of the pair of support leg portions includes a plurality of receiving seats being formed in an upper surface of the each of the support leg portions, which intersects with a turning direction of the each of the support leg portions and faces the each of the brace portions, having a recessed shape capable of receiving the anchor portion of the each of the brace portions, and being arrayed in a longitudinal direction of the each of the support leg portions, and wherein, in accordance with which one of the plurality of receiving seats of the each of the support leg portions receives the anchor portion of the each of the brace portions, an angle of the support leg portions with respect to the placement portion is changeable so that an inclination angle of the portable terminal placed on the placement portion is changeable.

7. The support device for the portable terminal according to claim 6, wherein the pair of support leg portions and the pair of brace portions are folded in parallel to the rear surface of the placement portion so that the portable terminal placed on the placement portion is set in a lying posture.

8. The support device for the portable terminal according to claim 1,
    wherein the placement portion has a structure so as to correspond to the portable terminal with the hand belt to which a pad is mounted so as to surround the hand belt, and
    wherein the placement portion further includes a pad-receiving recessed portion, which has a shape of being further recessed in the belt-receiving recessed portion, and is configured to receive the pad of the hand belt of the portable terminal placed on the placement portion.

9. The support device for the portable terminal according to claim 8,
    wherein the pad-receiving recessed portion has a through-hole shape penetrating through the placement portion, and
    wherein the placement portion further includes a pad-supporting wall portion, which extends rearward of the placement portion from a lower side portion of the pad-receiving recessed portion, and is configured to support the pad of the portable terminal placed on the placement portion.

10. A support device for a portable terminal, comprising a placement portion configured to place the portable terminal having a hand belt mounted to a back surface of the portable terminal and configured to receive a user's hand,
    the placement portion comprising:
        a terminal placement surface configured to support the back surface of the portable terminal placed on the placement portion; and
        a belt-receiving recessed portion, which has a shape recessed with respect to the terminal placement surface in a direction perpendicular to the terminal placement surface, and is configured to receive the hand belt of the portable terminal placed on the placement portion,
    wherein the support device for the portable terminal is configured to support the portable terminal placed on the placement portion under a state in which the portable terminal is inclined rearward,
    wherein the placement portion has a structure so as to correspond to the portable terminal with the hand belt to which a pad is mounted so as to surround the hand belt, and
    wherein the placement portion further includes a pad-receiving recessed portion, which has a shape of being further recessed in the belt-receiving recessed portion, and is configured to receive the pad of the hand belt of the portable terminal placed on the placement portion.

11. The support device for the portable terminal according to claim 10,
    wherein the pad-receiving recessed portion has a through-hole shape penetrating through the placement portion, and
    wherein the placement portion further includes a pad-supporting wall portion, which extends rearward of the placement portion from a lower side portion of the pad-receiving recessed portion, and is configured to support the pad of the portable terminal placed on the placement portion.

* * * * *

UNITED STATES PATENT AND TRADEMARK OFFICE
CERTIFICATE OF CORRECTION

PATENT NO. : 10,505,576 B2
APPLICATION NO. : 15/801857
DATED : December 10, 2019
INVENTOR(S) : Akihisa Iwata and Satoru Sugiyama Page 1 of 1

It is certified that error appears in the above-identified patent and that said Letters Patent is hereby corrected as shown below:

In the Specification

Column 4, Description of the Embodiments, Line 59; Delete "11" and insert --111-- therefor Signed and Sealed this
Twenty-fourth Day of November, 2020

Andrei Iancu
*Director of the United States Patent and Trademark Office*